ELECTRONIC SWITCHING DEVICES

Filed Sept. 16, 1965

INVENTOR.
SCATO ALBARDA
BY
Frank R. Jeffries
AGENT

United States Patent Office 3,422,312
Patented Jan. 14, 1969

3,422,312
ELECTRONIC SWITCHING DEVICES
Scato Albarda, Emmasingel, Eindhoven, Netherlands, assignor to North American Philips Company, Inc., New York, N.Y., a corporation of Delaware
Filed Sept. 16, 1965, Ser. No. 487,681
Claims priority, application Netherlands, Sept. 18, 1964, 6410880
U.S. Cl. 317—6 6 Claims
Int. Cl. H03k 17/74; 21/00

ABSTRACT OF THE DISCLOSURE

A device for converting a primary signal into a secondary signal having a frequency in predetermined ratio to the primary signal, by providing an arrangement for multiplying and dividing the primary signal in accordance with the input frequency. For high frequencies, the sequence is to divide and then multiply, whereas for low frequencies it is multiplication and then division.

Figure 1:
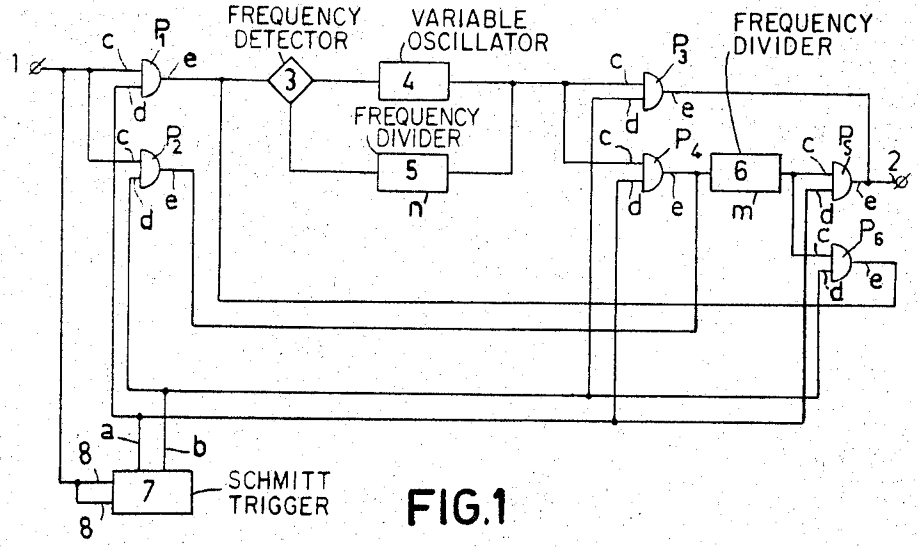

The invention relates to a device for converting a primary signal, for example, a pulse series having a frequency variable within wide limits (recurrence frequency), into a secondary signal the frequency of which is in a controllable ratio to that of the primary signal.

Such devices are known which are concerned with obtaining adjustable frequency ratios between two signals. In this case the primary signal, for example, has a given frequency $f_1$, while the frequency of the secondary signal must be, for example, a factor $n/m$ times as high, $n$ and $m$ being integral numbers.

In accordance with the present invention, frequency multiplication by the factor $n$ is accomplished by means of an auxiliary signal supplied by a variable oscillator which is controlled by a control voltage in a control loop. In this control loop the auxiliary signal is divided via a frequency divider by a factor $n$. The resultant frequency is applied to a frequency detector to which the primary signal is also applied. When the two frequencies are different, the detector supplies a varying control voltage for the oscillator which will thereby start oscillating at a higher or lower frequency, depending on the magnitude and direction of the varying control voltage. When there is no difference between the primary frequency and the frequency of the divided auxiliary signal, equilibrium is reached so that the frequency of the auxiliary signal stabilizes at a factor $n$ times as high as the primary frequency.

After the variable oscillator, a second divider ensures the division by the factor $m$, so that the required frequency ratio of $n/m$ between the secondary signal and the primary signal is obtained.

When the primary frequency is variable between wide limits, the controllable oscillator must be capable of following the said variations of the primary frequency multiplied by the said factor $n$. In practice this presents difficulties; a stable operation of the control loop over the frequency range of the primary signal which is $n$ times as large is difficult to obtain.

The object of this invention is to provide a device in which a good operation over a large frequency range is obtained without it being necessary for the control loop to meet high requirements.

The invention is characterized in that the second frequency divider is automatically connected before or after the control loop in accordance with the frequency of the primary signal.

The invention is based on the recognition of the fact that, when the primary signal has a relatively high frequency, the second frequency divider can first be used for dividing the said relatively high frequency $f_1$ by the factor $m$, so that the frequencies presented to the further circuit are reduced by the said factor. In this manner the control range of the control loop can also be used, in addition to the corresponding low frequency range of the primary signal, for the high frequency range of the primary signal divided by the factor $m$. So the frequency range of the primary signal is divided into two parts, the low frequency part of which is directly applied to the control loop and the high frequency part is applied to the control loop through the $m$-divider. This arrangement of the $m$-divider before or after the control loop may be effected, for example, by a bistable multivibrator or a suitably arranged Schmitt-trigger with frequency-sensitive input. When the frequency of the primary signal arrives in a given range, the Schmitt-trigger will connect the $m$-divider before the control loop when the frequency increases and after the control loop when the frequency decreases.

Figure 2:
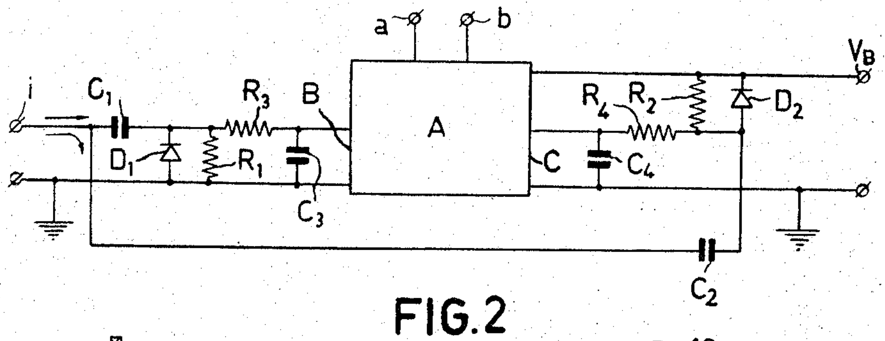

In order that the invention may readily be carried into effect, it will now be described in greater detail, by way of example, with reference to the accompanying drawing, in which:

FIG. 1 shows a diagram of the device according to the invention,

FIG. 2 of the drawing is a diagram of the Schmitt-trigger with frequency-sensitive input.

Figure 3:
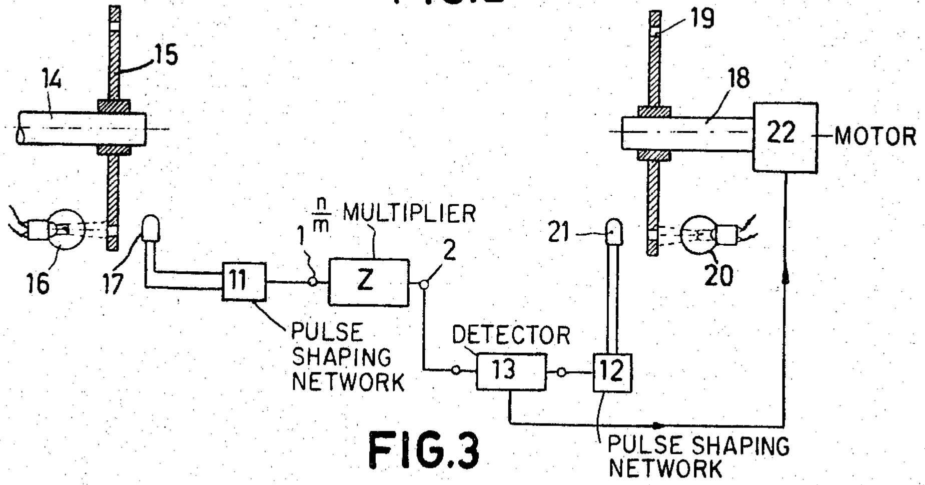

FIG. 3 of the drawing shows a practical embodiment of the invention.

In FIG. 1 the primary signal is presented to point 1. The secondary signal appears at point 2. A standard frequency multiplier is provided wherein 3 denotes the frequency detector, 4 the variable oscillator, and 5 the $n$-divider. The frequency divider includes 6 the $m$-divider, while 7 is the Schmitt-trigger with frequency-sensitive input. The gates denoted $P_1$ to $P_6$ are known diode-and-gates. When, for example, a positive signal appears at the two inputs $c$ and $d$ of such a gate, a signal appears at the output thereof, the gate is then opened. When a positive signal appears at only one of the inputs, no signal appears at the output and the gate is closed.

The operation of the circuit arrangement is as follows. The primary signal 1 appears at the inputs 8 of the Schmitt-trigger and at the inputs $c$ of the gates $P_1$ and $P_2$. When the frequency $f_1$ of the primary signal is low, for example, a positive voltage is set up at the output $a$ of the Schmitt-trigger, while the output $b$ has no voltage. As a result of this the input $d$ of the gate $P_1$ is also energized so that this gate is opened while the gate $P_2$ is closed. The primary signal thus appears at the output $e$ of the gate $P_1$. From this point the normal operation takes place so that at the inputs $c$ of the gates $P_3$ and $P_4$ the auxiliary signal with frequency $nf_1$ appears. However, the gate $P_3$ is closed because no positive voltage is present at the output $b$ of the trigger. The gate $P_4$ is opened by the signal at the inputs $c$ and $d$ so that the auxiliary signal is divided by $m$ in the frequency divider 6. In this manner this signal appears at the inputs $c$ of the gates $P_5$ and $P_6$ which signal is transmitted through the opened gate $P_5$ to the output 2. The gate $P_6$ is closed. On the other hand, when the primary frequency is high, the Schmitt-trigger output $b$ will convey a signal so that now the gates $P_1$, $P_4$ and $P_5$ are closed while the gates $P_2$, $P_3$ and $P_6$ are opened. As a result of this the signal will be directed through gate $P_2$ directly to the $m$-divider 6 and thence to the gate $P_6$ back to the input of the control loop. Then the handled signal arrives at the output 2 of the device through the gate $P_3$. In FIG. 2, A is the known Schmitt-trigger. The presented signal is applied to the two inputs $i$ of the frequency-sensitive inputs of the Schmitt-trigger. The frequency-sensitive inputs are formed by the capacitors $C_1$ and $C_2$ in series with the resistors $R_3$ and $R_4$. The point between the capacitors $C_1$ and $C_2$ respectively and the resistors $R_3$ and $R_4$ respectively is connected to a point of constant potential reference level (illustrated as ground) by the parallel arrangement of a resistor $R_1$ and a diode $D_1$ and a resistor $R_2$ and a diode $D_2$ respectively, the latter going through source $V_B$ to connect to ground. The diodes $D_1$ and $D_2$ are connected so that at one input the positive signals and at the other input the negative signals flow away through the said diodes. With regard to diode $D_1$ those signals below the reference level flow away through the ground connection. With regard to diode $D_2$, those signals of a value exceeding the reference level $V_B$ flow away through the source $V_B$ to ground. Finally a capacitor $C_3$ and $C_4$ respectively, is connected parallel to the inputs B and C of the Schmitt-trigger.

The two outputs of the Schmitt-trigger are denoted by *a* and *b*.

The operation of the circuit arrangement is as follows.

The presented signal is first differentiated in the device by the combination of the capacitors $C_1$ and $C_2$ respectively and the resistors $R_1$ and $R_2$ respectively. In the combination of the capacitors $C_4$ and $C_3$ respectively and the resistors $R_3$ and $R_4$ the said differentiated signal is integrated so that a direct voltage is set up across each of the capacitors $C_3$ and $C_4$ with values dependent upon the frequency of the signal. A positive voltage is formed at the capacitor $C_3$ and a negative voltage is formed at the capacitor $C_4$. The value of the delay times $\tau_3$ and $\tau_4$ of the resistor-capacitor combinations $R_3C_3$ and $R_4C_4$ are chosen to be different so that the voltages at the capacitors for different frequency ranges reach the value for flipping over of the trigger. As a result of this a frequency $f'$ at which the voltage at the capacitor $C_3$ is sufficiently large to cause the trigger to flip over, has a different value than the frequency $f''$ at which that voltage at the capacitor $C_4$ is reached. In the case of low frequencies of the primary signal the trigger is in a given position in which, for example, the output *a* has a positive voltage and the output *b* has a negative voltage.

Flipping over can be obtained only, for example, by a sufficient voltage at the capacitor $C_3$. This required voltage is obtained when the frequency of the primary signal reaches a value $f'$. The trigger flips over and the output *b* now obtains a positive voltage and the output *a* a negative voltage. At this instant the *m*-divider is switched from its position after the control loop frequency multiplier to before the control loop. When the frequency of the primary signal decreases below a value $f''$ the voltage at the capacitor $C_4$ causes the trigger to flip over to the old condition again. This frequency $f''$ is chosen to be lower than the frequency $f'$. As a result of this it is reached that, when the frequency of the primary signal is immediately in the proximity of $f'$ or $f''$, there is no chance that the trigger will perform reciprocating flippings-over.

The device according to the invention may be used, for example, to obtain adjustable ratios of the numbers of rotation between two rotating shafts. In this case the conventional gear boxes which are often complicated as a result of the number of ratios to be chosen are avoided. FIG. 3 diagrammatically shows the use of the said device. In this figure, 14 and 18 denote two shafts on which discs 15 and 19 which are perforated at the circumference are mounted. 16 and 20 are light sources which are arranged opposite to photo-sensitive elements 17 and 21 in a manner such that the photo-sensitive elements can be radiated by the light sources through the holes in the discs. Devices 11 and 12 are known pulse-shaping networks. Z is the device shown in FIG. 1, 13 denotes a detector in which a control voltage is produced and 22 is the controlled driving motor for the shaft 18. As a result of the rotation of the discs on the shafts, a pulsatory signal appears at the outputs of the photosensitive elements. This signal is processed to rectangular pulses in the networks 12 and 13. The recurrence frequencies of the said pulse series are equal to the number of rotation of the shaft in question. In the device Z the frequency is multiplied by a desired factor $n/m$ and applied to the detector 13. The frequency $f_2$ is presented to the other input of the detector. The said pulse series with recurrence frequency $f_1 \cdot n/m$ and $f_2$ are compared in the detector. When the said frequency is $n/m \cdot f_1$ and $f_2$ are unequal a control voltage is applied which controls the frequency $f_2$ until the frequencies are equal. In this manner a transmission between two shafts which is variable over a large range is obtained by the ratio $n/m$ to be adjusted in Z between the numbers of rotation. This variable transmission is now possible especially between wide limits as a result of the possibility of switching the second frequency divider before or after the control loop in the device Z.

When, for example, the frequency $f_1$ varies from $1 \times f_1$ to $250 \times f_1$, the switching frequency $f'$ of the frequency-sensitive Schmitt-trigger, when, for example, always $m=16$, will be chosen at $16f_1$, so that only a frequency range of $1 \times f_1$ to $16 \times f_1$ for the whole frequency range to be produced is presented to the control loop.

What is claimed is:

1. A device for converting a repetitive primary signal into a secondary signal having a frequency in controllable ratio to the frequency of said first signal comprising a frequency multiplier, a frequency divider, and a frequency sensitive switch having a first state in response to a relatively low frequency primary signal and a second state in response to a relatively high frequency primary signal, said device further including an input point for said primary signal and an output point for said secondary signal, means responsive to the first state of said frequency sensitive switch to connect said input point to said frequency multiplier, said frequency multiplier to said frequency divider, and said frequency divider to said output point, and means responsive to the second state of said frequency sensitive switch to connect said input point to said frequency divider, said frequency divider to said frequency multiplier, and said frequency multiplier to said output point.

2. The combination of claim 1 wherein said frequency sensitive switch comprises a trigger circuit having first and second frequency sensitive differentiating circuit inputs, each responsive to said primary signal, said first differentiating circuit supplying said trigger circuit with a positive triggering voltage at a first frequency of said primary signal, and said second differentiating circuit supplying said trigger circuit with a negative triggering voltage at a second frequency of said primary signal.

3. The combination of claim 1 wherein said primary signal is derived from the number of rotations of a rotary shaft, said secondary signal serving to control the number of rotations of a second rotating shaft.

4. A device for converting a repetitive primary signal into a secondary signal having a frequency in controllable ratio to the frequency of said first signal comprising a frequency multiplier, a frequency divider, and a frequency sensitive switch for generating a first signal in response to a relatively low frequency primary signal and a second signal in response to a relatively high frequency primary signal, said device further including an input point for said primary signal and an output point for said secondary signal, first gating means responsive to the presence of said first signal and said primary signal to connect said input point to said frequency multiplier, said frequency multiplier to said frequency divider and said frequency divider to said output point, and second gating means responsive to the presence of said second signal and said primary signal to connect said input point to said frequency divider, said frequency divider to said frequency multiplier, and said frequency multiplier to said output point.

5. The combination of claim 4 wherein said frequency sensitive switch comprises a trigger circuit having first and second frequency sensitive differentiating circuit inputs, each responsive to said primary signal, said first differentiating circuit supplying said trigger circuit with a positive triggering voltage at a first frequency of said primary signal, and said second differentiating circuit supplying said trigger circuit with a negative triggering voltage at a second frequency of said primary signal.

6. The combination of claim 8 wherein said primary signal is derived from the number of rotations of a rotary shaft, said secondary signal serving to control the number of rotations of a second rotating shaft.

References Cited

UNITED STATES PATENTS 3,320,546 5/1967 Allen et al. -------- 321—61 X

LEE T. HIX, *Primary Examiner*.

U.S. Cl. X.R.

321—60